United States Patent
Chung et al.

(10) Patent No.: US 12,365,233 B2
(45) Date of Patent: Jul. 22, 2025

(54) HYBRID POWER TRANSMISSION SYSTEM

(71) Applicant: APh ePower Co., Ltd., Kaohsiung (TW)

(72) Inventors: Cheng-Ta Chung, Kaohsiung (TW); Chien-Hsun Wu, Kaohsiung (TW); Hsiu-Hsien Su, Kaohsiung (TW); Shang-Zeng Huang, Kaohsiung (TW)

(73) Assignee: APh ePower Co., Ltd., Kaohsiung (TW)

( * ) Notice: Subject to any disclaimer, the term of this patent is extended or adjusted under 35 U.S.C. 154(b) by 0 days.

(21) Appl. No.: 18/637,443

(22) Filed: Apr. 16, 2024

(65) Prior Publication Data

US 2025/0033458 A1    Jan. 30, 2025

(30) Foreign Application Priority Data

Jul. 27, 2023 (TW) ................. 112128163

(51) Int. Cl.
  *B60K 6/445* (2007.10)
  *B60K 6/365* (2007.10)
  *B60K 6/387* (2007.10)
  *B60K 6/442* (2007.10)

(52) U.S. Cl.
  CPC .............. *B60K 6/442* (2013.01); *B60K 6/365* (2013.01); *B60K 6/387* (2013.01); *B60Y 2200/92* (2013.01)

(58) Field of Classification Search
  CPC ........ B60K 6/442; B60K 6/365; B60K 6/387; B60K 7/0007; B60K 6/40; B60K 6/445; B60K 6/44; B60K 6/38; B60Y 2200/92; B60Y 2200/12
  See application file for complete search history.

(56) References Cited

U.S. PATENT DOCUMENTS

| 10,780,769 B1 | 9/2020 | Cho et al. | |
| 2014/0336893 A1* | 11/2014 | Ideshio | ............... B60K 6/48 701/70 |
| 2016/0101681 A1 | 4/2016 | Okuwaki et al. | |

(Continued)

FOREIGN PATENT DOCUMENTS

| CN | 106915244 A | * | 7/2017 | ............. B60K 6/365 |
| CN | 111231647 A | * | 6/2020 | ............. B60K 6/365 |
| CN | 114734805 A | * | 7/2022 | ............... B60K 6/26 |

(Continued)

OTHER PUBLICATIONS

"Search Report of European Counterpart Application", issued on Oct. 22, 2024, p. 1-p. 9.

(Continued)

*Primary Examiner* — Tisha D Lewis
(74) *Attorney, Agent, or Firm* — JCIPRNET

(57) ABSTRACT

A hybrid power transmission system including an engine, a power split device, a first electric machine, a second electric machine, a power controller, an energy storage module, and a wheel. The power split device is connected to the engine. The first electric machine is connected to the power split device. The second electric machine is connected to the power split device. The power controller is coupled to the first electric machine and the second electric machine. The energy storage module is coupled to the power controller. The wheel is connected to the second electric machine.

9 Claims, 7 Drawing Sheets

(56) References Cited

U.S. PATENT DOCUMENTS

2024/0017727 A1* 1/2024 Eastman ........... B60W 50/0098

FOREIGN PATENT DOCUMENTS

| | | | | |
|---|---|---|---|---|
| EP | 0967102 | 12/1999 | | |
| JP | H11170881 | 6/1999 | | |
| JP | 2017178299 | 10/2017 | | |
| JP | 6604279 B2 * | 11/2019 | ............ | B60K 6/365 |
| JP | 2022092575 | 6/2022 | | |
| TW | M637878 | 2/2023 | | |
| WO | 2011022940 | 3/2011 | | |

OTHER PUBLICATIONS

"Office Action of Japan Counterpart Application", issued on May 30, 2025, p. 1-p. 4.

* cited by examiner

HYBRID POWER TRANSMISSION SYSTEM

CROSS-REFERENCE TO RELATED APPLICATION

This application claims the priority benefit of Taiwan application serial no. 112128163, filed on Jul. 27, 2023. The entirety of the above-mentioned patent application is hereby incorporated by reference herein and made a part of this specification.

BACKGROUND

Technical Field

The disclosure relates to a power transmission system, and in particular to a hybrid power transmission system.

Description of Related Art

Nowadays, with the rise of environmental awareness in the world, more and more countries have begun to formulate relevant laws to regulate the environmental standards of fuel vehicles. As a result, electric vehicles are booming. As a kind of transportation vehicle that is different from fuel vehicles, the electric vehicles have the advantages of not emitting exhaust gas and low noise, and are regarded as an important tool to achieve low-carbon transportation.

However, the development of existing energy storage technology and charging technology is limited, resulting in a bottleneck in the cruising range of the electric vehicles. Therefore, as a transitional product before the complete development of the electric vehicles, gasoline-electric hybrid vehicles have higher endurance than the electric vehicles and better environmental performance than fuel vehicles. Yet, the power system of the existing gasoline-electric hybrid vehicles is complex, involving the connection between transmission structures such as fuel engines, electric motors, and gearboxes, and there is energy loss during the power transmission process among various transmission mechanisms, which result in low efficiency in the energy use of the gasoline-electric hybrid vehicles.

SUMMARY

The disclosure provides a hybrid power transmission system which can switch to a hybrid electric mode, a pure engine mode, or a pure motor mode to improve energy efficiency according to different operating situations.

A hybrid power transmission system of the disclosure includes an engine, a power split device, a first electric machine, a second electric machine, a power controller, an energy storage module, and a wheel. The power split device is connected to the engine. The first electric machine is connected to the power split device. The second electric machine is connected to the power split device. The power controller is coupled to the first electric machine and the second electric machine. The energy storage module is coupled to the power controller. The wheel is connected to the second electric machine. The engine is adapted to drive the second electric machine and the wheel by the power split device. The energy storage module is adapted to drive the second electric machine and the wheel by the power controller. The engine is adapted to drive the first electric machine and drive the second electric machine and the wheel by the power controller.

In an embodiment of the disclosure, the aforementioned power split device has a ring gear, a deceleration gear, a planetary gear set, and a sun gear. The deceleration gear is connected to the engine and engages with an external gear of the ring gear. The planetary gear set engages with an internal gear of the ring gear. The sun gear is connected to the first electric machine and engages with the planetary gear set.

In an embodiment of the disclosure, a clutch is further included and is disposed between the sun gear and the ring gear.

In an embodiment of the disclosure, a transmission mechanism is further included, and the transmission mechanism is connected to the power split device, the second electric machine, and the wheel.

In an embodiment of the disclosure, the aforementioned transmission mechanism has a first transmission wheel, a second transmission wheel, a third transmission wheel, a fourth transmission wheel, and a first chain. The first transmission wheel is fixedly connected to the planetary gear set. The second transmission wheel is adjacent to the first transmission wheel. The third transmission wheel is coaxially connected to the second transmission wheel. The fourth transmission wheel is coaxially connected to the second electric machine and the wheel. The fourth transmission wheel engages with the third transmission wheel.

In an embodiment of the disclosure, the aforementioned transmission mechanism has a first transmission wheel, a second transmission wheel, a third transmission wheel, a fourth transmission wheel, a first chain, and a second chain. The first transmission wheel is fixedly connected to the planetary gear set. The second transmission wheel is adjacent to the first transmission wheel. The third transmission wheel is coaxially connected between the second transmission wheel and the second electric machine. The fourth transmission wheel is coaxially connected to the wheel. The first chain is sleeved on the first transmission wheel and the second transmission wheel. The second chain is sleeved on the third transmission wheel and the fourth transmission wheel.

In an embodiment of the disclosure, in a pure engine mode, the clutch locks the sun gear and the ring gear integrally, so that the planetary gear set and the ring gear form a rigid body. The engine is adapted to generate a first mechanical energy and directly drive the power split device by the deceleration gear.

In an embodiment of the disclosure, in a hybrid electric mode, the clutch separates the sun gear and the ring gear. The engine is adapted to generate a first mechanical energy. A part of the first mechanical energy drives the second electric machine by the power split device. Another part of the first mechanical energy drives the first electric machine by the power split device to generate a second electric energy. The second electric energy is provided to the second electric machine by the power controller. The second electric machine generates a second mechanical energy to drive the wheel.

In an embodiment of the disclosure, in a pure motor mode, the energy storage module generates a first electric energy. The first electric energy is provided to the first electric machine and the second electric machine by the power controller. The second electric machine generates a second mechanical energy to drive the wheel to rotate.

Based on the above, the hybrid power transmission system of the disclosure is adaptable for motorcycles, cars, or similar transportation vehicles, and combines the power sources such as engines, first electric machines, second electric machines, and energy storage modules. The hybrid power transmission system of the disclosure may switch to the hybrid electric mode, the pure engine mode, or the pure motor mode according to the driving situation and correspondingly turn on or off the engine, the first electric machine, the second electric machine, and the energy storage module to reduce energy consumption and improve the driving endurance performance of the transportation vehicle.

Further, when the hybrid power transmission system of the disclosure switches between the pure engine mode and the hybrid electric mode, switching the clutch is only needed to achieve the switching purpose. Compared with the existing compound power system, the hybrid power transmission system of the disclosure simplifies the switching steps and has a simple structure.

DESCRIPTION OF THE EMBODIMENTS

Figure 1:
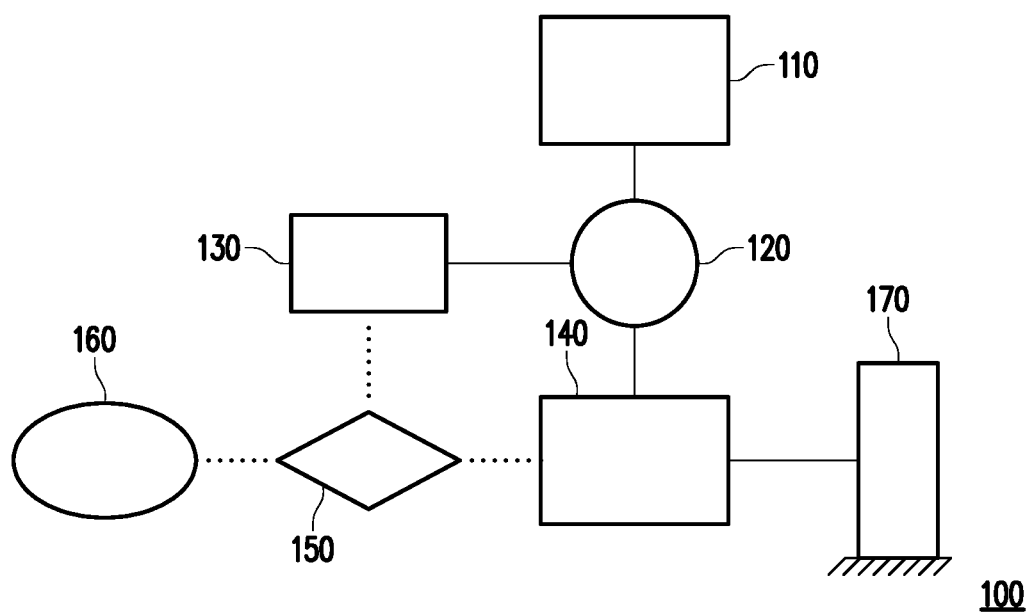
FIG. 1 is a schematic block diagram of a hybrid power transmission system of the disclosure.
Figure 2:
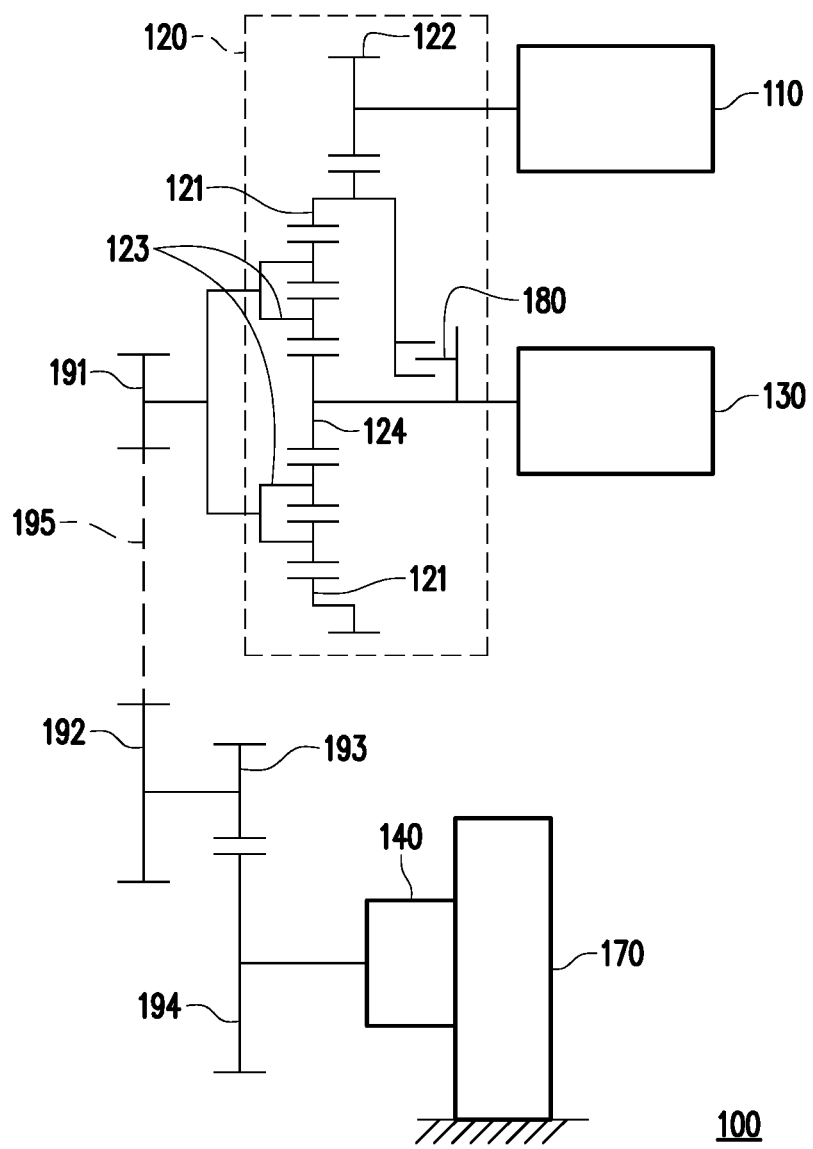
FIG. 2 is a schematic structural connection diagram of the hybrid power transmission system in FIG. 1 according to an embodiment of the disclosure.
Figure 3:
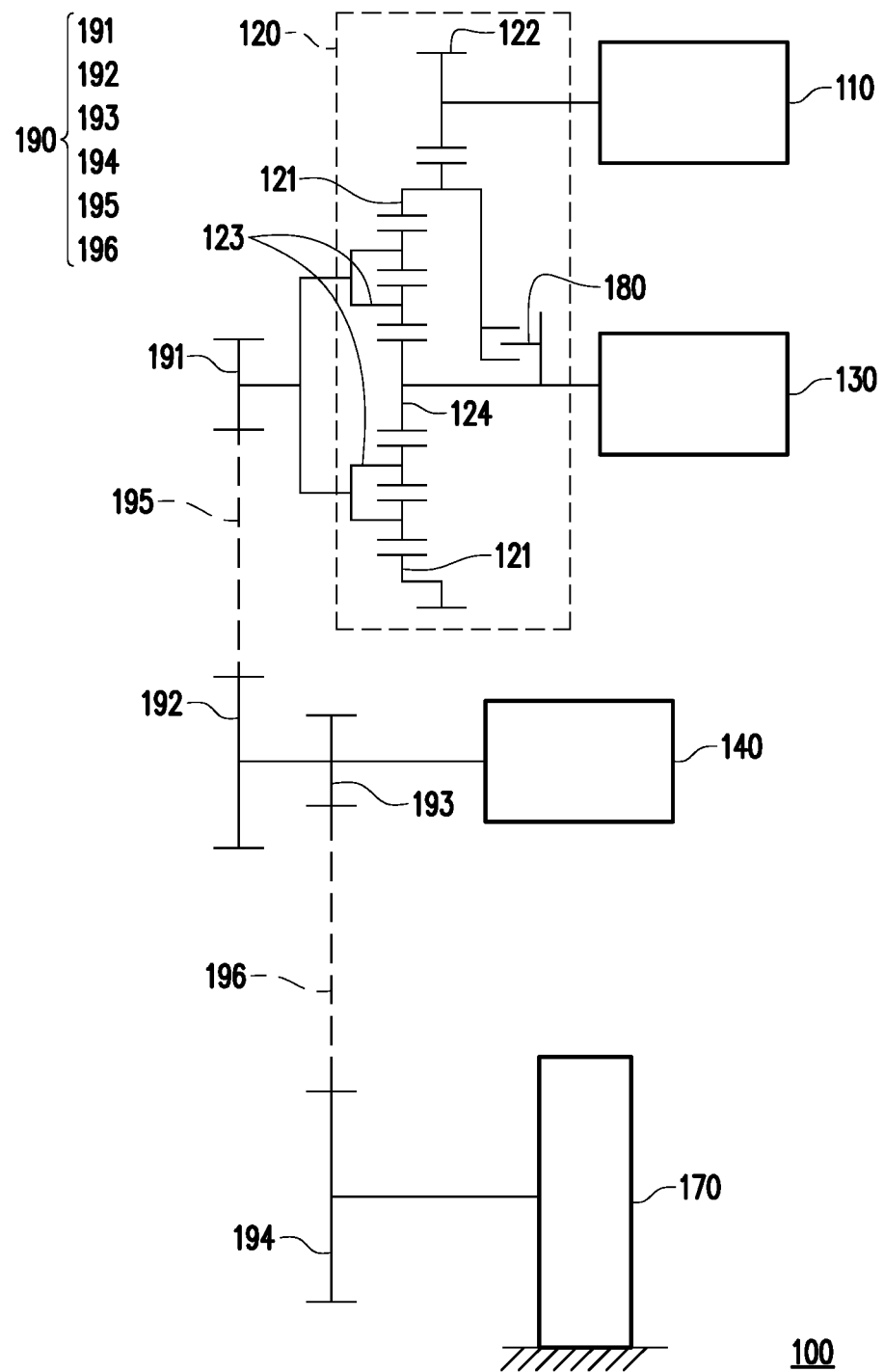
FIG. 3 is a schematic structural connection diagram of the hybrid power transmission system in FIG. 1 according to another embodiment of the disclosure.

FIG. 1 is a schematic block diagram of a hybrid power transmission system of the disclosure. FIG. 2 is a schematic structural connection diagram of the hybrid power transmission system in FIG. 1 according to an embodiment of the disclosure. FIG. 3 is a schematic structural connection diagram of the hybrid power transmission system in FIG. 1 according to another embodiment of the disclosure.

Referring to FIG. 1 to FIG. 3, a hybrid power transmission system 100 of the disclosure is adaptable for motorcycles, cars, or similar transportation vehicles, and includes an engine 110, a power split device 120, a first electric machine 130, a second electric machine 140, a power controller 150, an energy storage module 160, and a wheel 170.

The engine 110 is disposed in the vehicle and adopts fuel as an energy source. The power split device 120 is connected to the engine 110. The first electric machine 130 is connected to the power split device 120. The second electric machine 140 is connected to the power split device 120. The power controller 150 is coupled to the first electric machine 130 and the second electric machine 140. The energy storage module 160 is coupled to the power controller 150. The wheel 170 is connected to the second electric machine 140.

Referring to FIG. 1, the engine 110 is adapted to drive the first electric machine 130 and drive the second electric machine 140 and the wheel 170 by the power controller 150. The engine 110 also directly drives the second electric machine 140 by the power split device 120 to switch to a hybrid electric mode. The engine 110 is adapted to drive the second electric machine 140 and the wheel 170 by the power split device 120 to switch to a pure engine mode. The energy storage module 160 is adapted to drive the second electric machine 140 and the wheel 170 by the power controller to switch to a pure motor mode.

Referring to FIG. 2 and FIG. 3, the power split device 120 has a ring gear 121, a deceleration gear 122, a planetary gear set 123, and a sun gear 124.

The ring gear 121 has an internal gear and an external gear (not shown in the figures). The deceleration gear 122 is connected to a rotating shaft of the engine 110 and engages with the external gear of the ring gear 121. Therefore, the power of the engine 110 may be transmitted to the ring gear 121 by the deceleration gear 122. The planetary gear set 123 engages with the internal gear of the ring gear 121, which means that the ring gear 121 may drive the planetary gear set 123 by the internal gear. The sun gear 124 is connected to a rotating shaft of the first electric machine 130 and engages with the planetary gear set 123. Therefore, the power generated by the first electric machine 130 may be transmitted to the planetary gear set 123 by the sun gear 124.

The hybrid power transmission system 100 includes a clutch 180 disposed between the sun gear 124 and the ring gear 121. When the clutch 180 is in a separated state, the sun gear 124 and the ring gear 121 are two independent components and are able to rotate freely. When the clutch 180 is in a junction state, the sun gear 124 and the ring gear 121 are connected integrally and rotate synchronously. Multiple power sources of the disclosure change the state of the power split device 120 by a switch of the clutch 180, so the switching steps of the hybrid power transmission system 100 are simplified.

Referring to FIG. 2 and FIG. 3, the hybrid power transmission system 100 includes a transmission mechanism 190. The transmission mechanism is connected to the power split device 120, the second electric machine 140, and the wheel 170. In short, the power of the engine 110 and the first electric machine 130 is transmitted to the wheel 170 via the power split device 120 and the transmission mechanism 190, and the power of the second electric machine 140 is transmitted to the wheel 170 via the transmission mechanism 190. The power sources of the disclosure share the same transmission mechanism 190, so the hybrid power transmission system 100 has a simple structure.

Referring to FIG. 2, the transmission mechanism 190 has a first transmission wheel 191, a second transmission wheel 192, a third transmission wheel 193, a fourth transmission wheel 194, and a first chain 195. The first transmission wheel 191 is fixedly connected to the planetary gear set 123. The second transmission wheel 192 is adjacent to the first transmission wheel 191. The third transmission wheel 193 is coaxially connected to the second transmission wheel 192. The fourth transmission wheel 194 is coaxially connected to the second electric machine 140 and the wheel 170. The fourth transmission wheel 194 also engages with the third transmission wheel 193. The second electric machine 140 directly adopts a wheel hub motor and is coaxially installed on the wheel 170.

In short, a power transmission path of the engine 110 and the first electric machine 130 is from the power split device 120, the first transmission wheel 191, the first chain 195, the second transmission wheel 192, the third transmission wheel 193, the fourth transmission wheel 194, the second electric machine 140, and finally to the wheel 170 in sequence.

Referring to FIG. 3, there is difference between this embodiment and the embodiment of FIG. 2. The difference lies in that the transmission mechanism 190 has a first transmission wheel 191, a second transmission wheel 192, a third transmission wheel 193, a fourth transmission wheel 194, a first chain. 195, and a second chain 196. The first transmission wheel 191 is fixedly connected to the planetary gear set 123. The second transmission wheel 192 is adjacent to the first transmission wheel 191. The third transmission wheel 193 is coaxially connected between the second transmission wheel 192 and the second electric machine 140. The fourth transmission wheel 194 is coaxially connected to the wheel 170. The first chain 195 is sleeved on the first transmission wheel 191 and the second transmission wheel 192. The second chain 196 is sleeved on the third transmission wheel 193 and the fourth transmission wheel 194. The second electric machine 140 is connected in parallel to the power split device 120.

In short, a power transmission path of the engine 110 and the first electric machine 130 is from the power split device 120, the first transmission wheel 191, the first chain 195, the second transmission wheel 192, the third transmission wheel 193, the second electric machine 140, the second chain 196, the fourth transmission wheel 194, and finally to the wheel 170 in sequence.

Figure 4A:
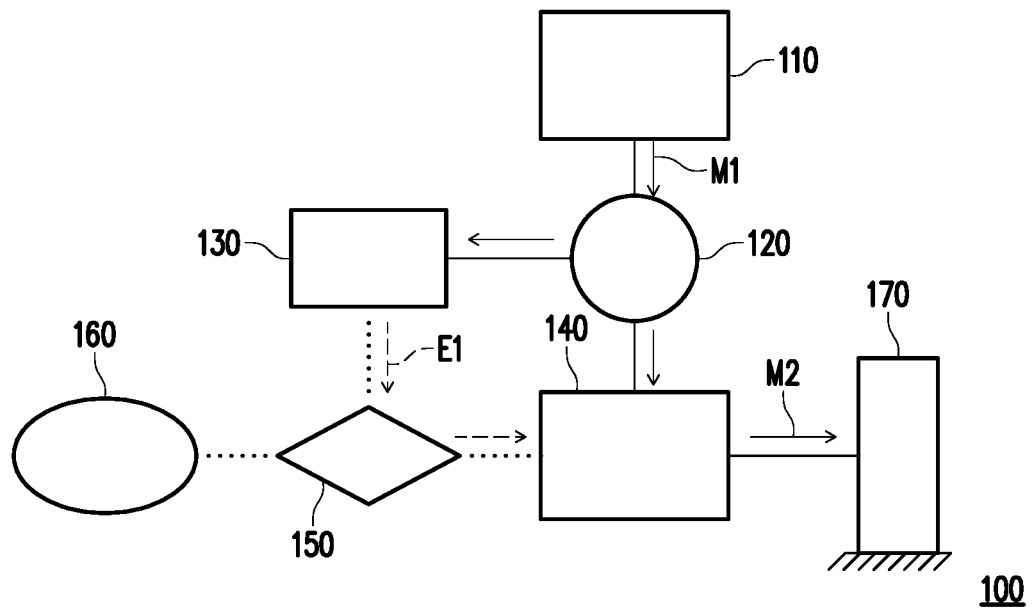
FIG. 4A is a schematic power transmission block diagram of the hybrid power transmission system in FIG. 1 in a hybrid electric mode.
Figure 4B:
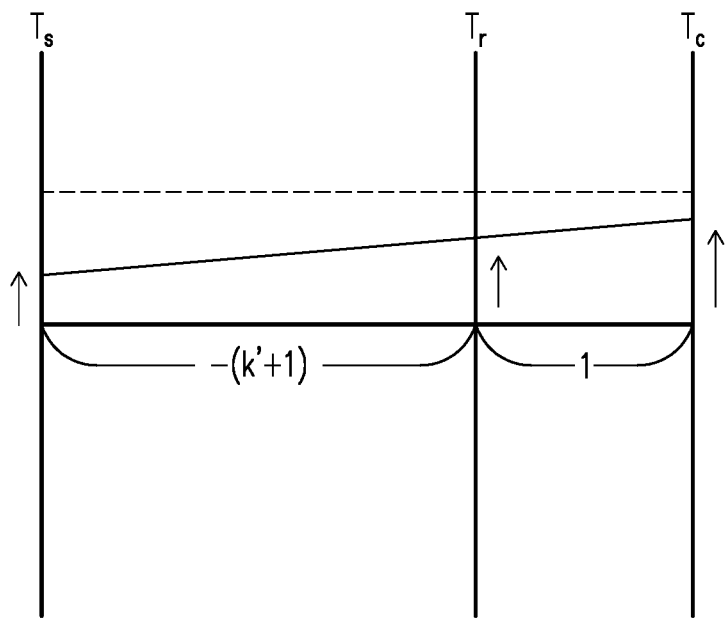
FIG. 4B is a rotational speed relationship diagram of an engine, a first electric machine, and a second electric machine in FIG. 4A.

FIG. 4A is a schematic power transmission block diagram of the hybrid power transmission system in FIG. 1 in a hybrid electric mode. FIG. 4B is a rotational speed relationship diagram of an engine, a first electric machine, and a second electric machine in FIG. 4A.

Referring to FIG. 2, FIG. 4A, and FIG. 4B, when the hybrid power transmission system 100 is in the hybrid electric mode, the clutch 180 unlocks the sun gear 124 and the ring gear 121. The engine 110 is adapted to generate a first mechanical energy M1 for transmission to the power split device 120, where a part of the first mechanical energy M1 directly drives the wheel 170 by the deceleration gear 122, the ring gear 121, and the transmission mechanism 190 to rotate, and another part of the first mechanical energy M1 drives the first electric machine 130 by the deceleration gear 122, the ring gear 121, and the sun gear 124 to generate a first electric energy E1. The first electric energy E1 is provided to the second electric machine 140 by the power controller 150. The aforementioned first mechanical energy M1 and the aforementioned first electric energy E1 are combined, which makes the second electric machine 140 generate a second mechanical energy M2 to drive the wheel 170 to rotate.

Referring to FIG. 4B, a torque relationship of the hybrid powertrain 100 is the following equation:

$$\frac{T_s}{1} = \frac{T_r}{k'} = \frac{T_c}{-(k'+1)},$$

where $T_s$, $T_r$, and $T_c$ are the output torques of the sun gear 124, the ring gear 121, and the planetary gear set 123 respectively. The parameter k' is defined as the following equation:

$$k' = -\frac{Z_r}{Z_s},$$

where $Z_r$ and $Z_s$ are the number of gears of the ring gear 121 and the sun gear 124 respectively.

The rotational speed relationship of the hybrid powertrain 100 is the following equation: $\omega_s + k'\omega_r - (k'+1)\omega_c = 0$, where $\omega_s$, $\omega_r$, and $\omega_c$ are the rotational speeds of the sun gear 124, the ring gear 121, and the planetary gear set 123 respectively. Since k'<0 and −(k'+1)>0, $T_s$ and $T_c$ have the same sign, so the ring gear 121 is connected to the engine 110 and serves as a power input terminal, while the sun gear 124 and the planetary gear set 123 serve as power load terminals or power output terminals.

According to a connection way of the hybrid power transmission system in FIG. 3, the relationship between the rotational speed and the torque may be written as the following equation:

$$\frac{T_{mg1}}{1} = \frac{r_e T_e}{k'} = \frac{\frac{T_w}{r_t}}{-(k'+1)}, \omega_{mg1} + k'\frac{\omega_e}{r_e} - (k'+1)\omega_w \cdot r_t = 0$$

Among them, $r_e$ is a deceleration ratio of the output terminal of the engine 110 to the external gear of the ring gear 121, $r_t$ is a deceleration ratio of the planetary gear set 123 to the wheel 170, and k' is a ratio of the number of gears of the internal gear of the ring gear 121 to the sun gear 124. The torque and rotational speed of the second electric machine 140 depend on an installation position of the second electric machine 140.

Figure 7:
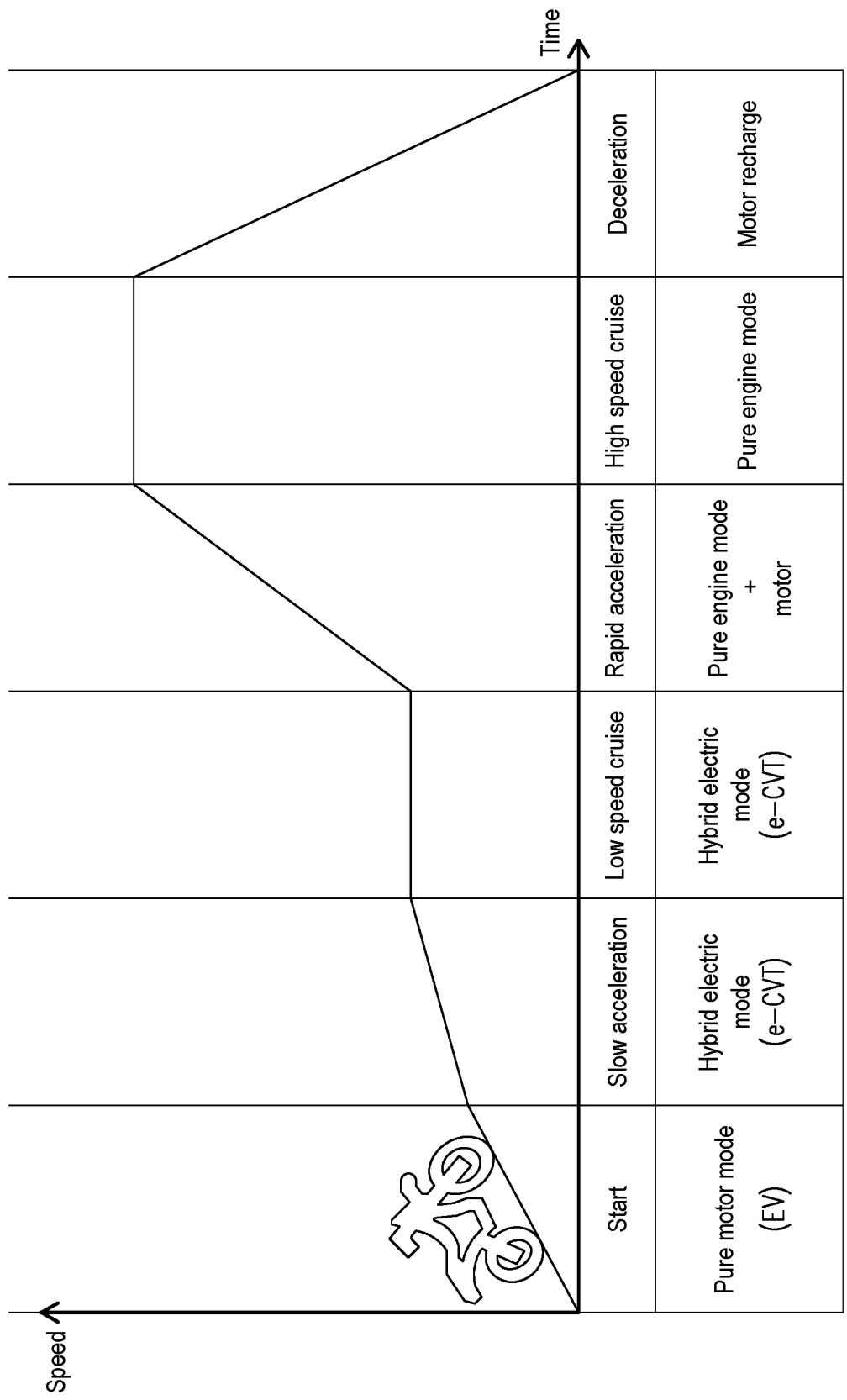
FIG. 7 is a schematic diagram of mode switching rules of the hybrid power transmission system in FIG. 1.

FIG. 7 is a schematic diagram of mode switching rules of the hybrid power transmission system in FIG. 1.

Referring to FIG. 7, the hybrid electric mode is adaptable for slow acceleration and low speed cruise. The first mechanical energy M1 generated by the engine 110 simultaneously drives the second electric machine 140 and the first electric machine 130, thereby adjusting the rotational speed and an operating point of the engine 110 to achieve energy saving and variable speed functions. In addition, the first electric machine 130 switches to a generator in the hybrid electric mode, generates the first electric energy E1, and directly drives the second electric machine 140. At the same time, the first electric machine 130 also serves as a load of the transmission system and continuously changes a ratio of the input speed of the engine 110 to the output rotational speed of the wheel 170.

Figure 5A:
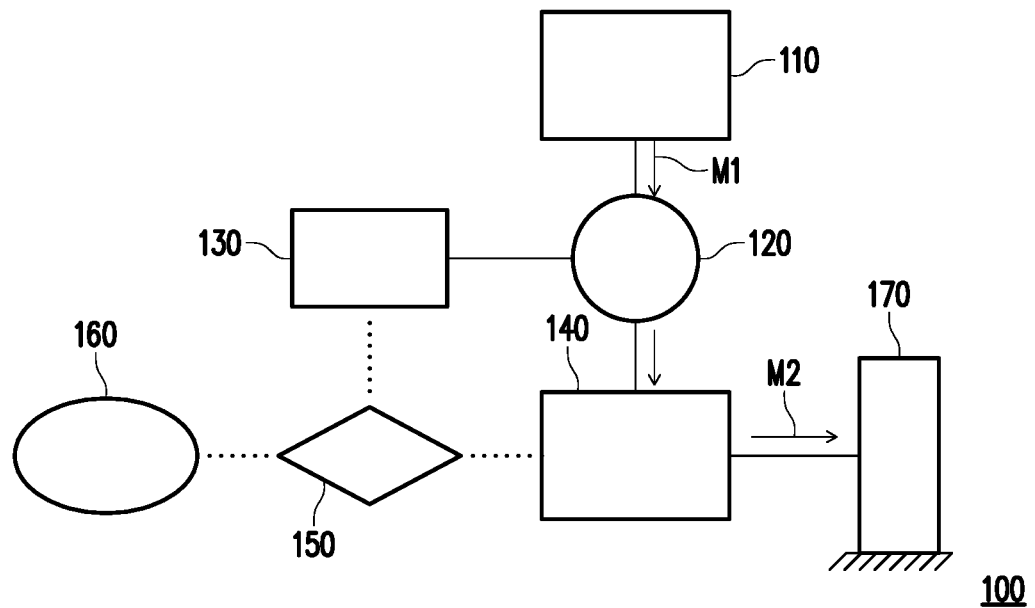
FIG. 5A is a schematic power transmission block diagram of the hybrid power transmission system in FIG. 1 in a pure engine mode.
Figure 5B:
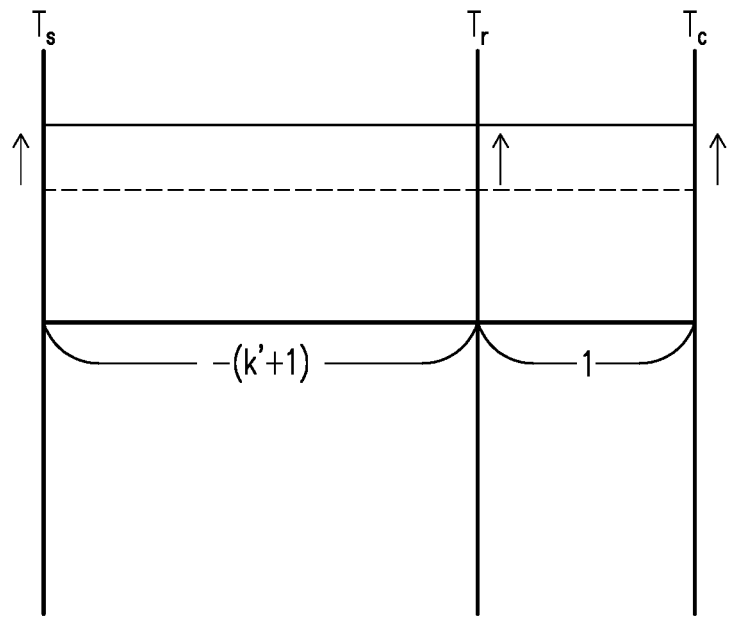
FIG. 5B is a rotational speed relationship diagram of an engine, a first electric machine, and a second electric machine in FIG. 5A.

FIG. 5A is a schematic power transmission block diagram of the hybrid power transmission system in FIG. 1 in a pure engine mode. FIG. 5B is a rotational speed relationship diagram of an engine, a first electric machine, and a second electric machine in FIG. 5A.

Referring to FIG. 3, FIG. 5A, and FIG. 5B, when the hybrid power transmission system 100 is in the pure engine mode, the clutch 180 locks the sun gear 124 and the ring gear 121 integrally, so that the planetary gear set 123 and the ring gear 121 form a rigid body. The engine 110 is adapted to generate the first mechanical energy M1 and directly drive the power split device 120 by the deceleration gear 122, and the power split device 120 directly drives the second electric machine 140 and the wheel 170 to rotate by the transmission mechanism 190.

Referring to FIG. 5B, $T_s$, $T_r$, and $T_c$ are the output torques of the sun gear 124, the ring gear 121, and the planetary gear set 123 respectively. Since the planetary gear set 123 and the ring gear 121 form the rigid body, the values of the output torques of the three are equal.

Referring to FIG. 7, the pure engine mode is adaptable for high speed cruise. The first mechanical energy M1 generated by the engine 110 directly drives the second electric machine 140 and the wheel 170 by the power split device 120 and the transmission mechanism 190. Since the first electric machine 130 and the power split device 120 form a rigid body, all the first mechanical energy M1 generated by the engine 110 is used to drive the second electric machine 140 and the wheel 170 to avoid the energy loss of converting mechanical energy into electric energy.

Figure 6A:
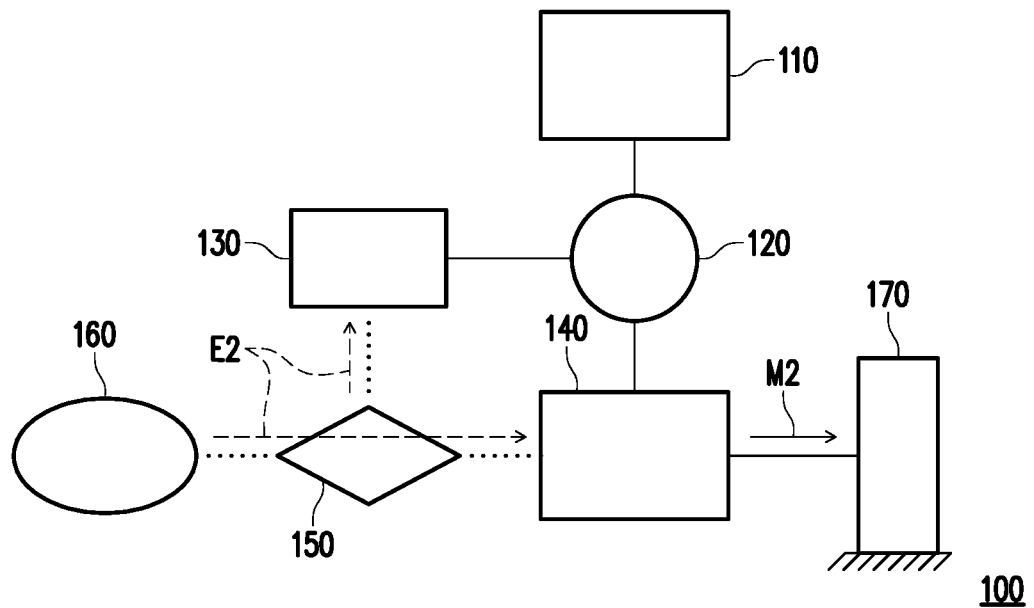
FIG. 6A is a schematic power transmission block diagram of the hybrid power transmission system in FIG. 1 in a pure motor mode.
Figure 6B:
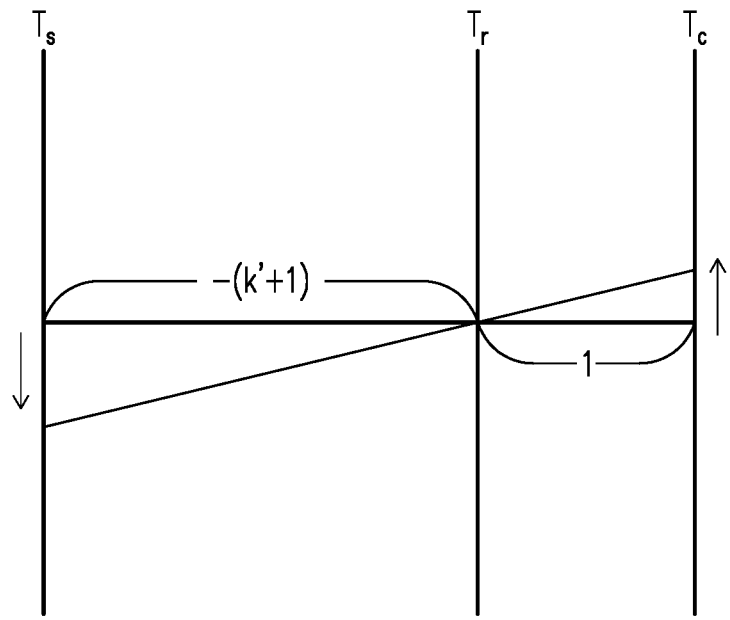
FIG. 6B is a rotational speed relationship diagram of an engine, a first electric machine, and a second electric machine in FIG. 6A.

FIG. 6A is a schematic power transmission block diagram of the hybrid power transmission system in FIG. 1 in a pure motor mode. FIG. 6B is a rotational speed relationship diagram of an engine, a first electric machine, and a second electric machine in FIG. 6A.

Referring to FIG. 3, FIG. 6A, and FIG. 6B, when the hybrid power transmission system 100 is in the pure motor mode, the engine 110 is not started, the energy storage module 160 generates a second electric energy E2 and provides the second electric energy E2 to the first electric machine 130 and the second by the power controller 150, and the second electric machine 140 generates a second mechanical energy M2 to drive the wheel 170 to rotate. Specifically, the first electric machine 130 here serves as a load that consumes parts of the second electric energy E2 and continuously changes the total amount of electric energy input by the energy storage module 160 to the second electric machine 140, thereby adjusting the output rotational speed of the wheel 170.

Referring to FIG. 6B, the rotational speed relationship of the hybrid power transmission system 100 is the following equation: $\omega_s + k'\omega_r - (k'+1)\omega_c = 0$, where $\omega_s$, $\omega_r$, and $\omega_c$ are the rotational speeds of the sun gear 124, the ring gear 121, and the planetary gear set 123 respectively. Since $k' > 0$ and $-(k'+1) < 0$, $T_s$ and $T_c$ have different signs, that is, a direction of torque action is opposite, so the planetary gear set 123 is connected to the second electric machine 140 and serves as the power output terminal, while the sun gear 124 serves as the power load terminal.

Referring to FIG. 7, the pure motor mode is adaptable for a start situation to prevent the engine 110 from consuming fuel in a stationary state.

Based on the above, the hybrid power transmission system of the disclosure is adaptable for motorcycles, cars, or similar transportation vehicles, and combines the power sources such as engines, first electric machines, second electric machines, and energy storage modules. The hybrid power transmission system of the disclosure may switch to the hybrid electric mode, the pure engine mode, or the pure motor mode according to the driving situation and correspondingly turn on or off the engine, the first electric machine, the second electric machine, and the energy storage module to reduce energy consumption and improve the driving endurance performance of the transportation vehicle.

Further, when the hybrid power transmission system of the disclosure switches between the pure engine mode and the hybrid electric mode, the clutch is turned on and off only to achieve the switching purpose. Compared with the existing compound power system, the hybrid power transmission system of the disclosure simplifies the switching steps and has a simple structure.

What is claimed is:

1. A hybrid power transmission system, comprising:
    an engine;
    a power split device, connected to the engine;
    a first electric machine, connected to the power split device;
    a second electric machine, connected to the power split device;
    a power controller, coupled to the first electric machine and the second electric machine;
    an energy storage module, coupled to the power controller; and
    a wheel, connected to the second electric machine,
    wherein, the engine is adapted to drive the second electric machine and the wheel by the power split device, the energy storage module is adapted to drive the second electric machine and the wheel by the power controller, and the engine is adapted to drive the first electric machine and drive the second electric machine and the wheel by the power controller.

2. The hybrid power transmission system according to claim 1, wherein the power split device has a ring gear, a deceleration gear, a planetary gear set, and a sun gear, the deceleration gear is connected to the engine and engages with an external gear of the ring gear, the planetary gear set engages with an internal gear of the ring gear, and the sun gear is connected to the first electric machine and engages with the planetary gear set.

3. The hybrid power transmission system according to claim 2, further comprising a clutch disposed between the sun gear and the ring gear.

4. The hybrid power transmission system according to claim 2, further comprising a transmission mechanism, wherein the transmission mechanism is connected to the power split device, the second electric machine, and the wheel.

5. The hybrid power transmission system according to claim 4, wherein the transmission mechanism has a first transmission wheel, a second transmission wheel, a third transmission wheel, a fourth transmission wheel, and a first chain, the first transmission wheel is fixedly connected to the planetary gear set, the second transmission wheel is adjacent to the first transmission wheel, the third transmission wheel is coaxially connected to the second transmission wheel, the fourth transmission wheel is coaxially connected to the second electric machine and the wheel, and the fourth transmission wheel engages with the third transmission wheel.

6. The hybrid power transmission system according to claim 4, wherein the transmission mechanism has a first transmission wheel, a second transmission wheel, a third transmission wheel, a fourth transmission wheel, a first chain, and a second chain, the first transmission wheel is fixedly connected to the planetary gear set, the second transmission wheel is adjacent to the first transmission wheel, the third transmission wheel is coaxially connected between the second transmission wheel and the second electric machine, the fourth transmission wheel is coaxially connected to the wheel, the first chain is sleeved on the first transmission wheel and the second transmission wheel, and the second chain is sleeved on the third transmission wheel and the fourth transmission wheel.

7. The hybrid power transmission system according to claim 3, wherein in a pure engine mode, the clutch locks the sun gear and the ring gear integrally, so that the planetary gear set and the ring gear form a rigid body, and the engine is adapted to generate a first mechanical energy and directly drive the power split device by the deceleration gear.

8. The hybrid power transmission system according to claim 3, wherein in a hybrid electric mode, the clutch separates the sun gear and the ring gear, the engine is adapted to generate a first mechanical energy, a part of the first mechanical energy drives the second electric machine by the power split device, another part of the first mechanical energy drives the first electric machine by the power split device to generate a second electric energy, the second electric energy is provided to the second electric machine by the power controller, and the second electric machine generates a second mechanical energy to drive the wheel.

9. The hybrid power transmission system according to claim 1, wherein in a pure motor mode, the energy storage module generates a first electric energy, the first electric energy is provided to the first electric machine and the second electric machine by the power controller, and the second electric machine generates a second mechanical energy to drive the wheel to rotate.

\* \* \* \* \*